(12) United States Patent
Kang et al.

(10) Patent No.: US 8,137,760 B2
(45) Date of Patent: Mar. 20, 2012

(54) NANOCRATER CATALYST IN METAL NANOPARTICLES AND METHOD FOR PREPARING THE SAME

(75) Inventors: Jeung-Ku Kang, Daejeon (KR); Augustine Saji, Daejeon (KR); Jung-Woo Lee, Daejeon (KR); Weon-Ho Shin, Daejeon (KR); Kyu-Sung Han, Daejeon (KR); Jung-Hoon Choi, Daejeon (KR)

(73) Assignee: Korea Advanced Institute of Science and Technology, Daejeon (KR)

(*) Notice: Subject to any disclaimer, the term of this patent is extended or adjusted under 35 U.S.C. 154(b) by 1132 days.

(21) Appl. No.: 12/000,375

(22) Filed: Dec. 12, 2007

(65) Prior Publication Data

US 2009/0098402 A1      Apr. 16, 2009

(30) Foreign Application Priority Data

Oct. 10, 2007   (KR) .................. 10-2007-0102100

(51) Int. Cl.
*H05H 1/00*   (2006.01)

(52) U.S. Cl. ........ 427/535; 427/245; 977/775; 977/777; 502/8; 502/9; 502/10; 502/527.24; 438/694

(58) Field of Classification Search ........................ None
See application file for complete search history.

(56) References Cited

OTHER PUBLICATIONS

He, Langmuir (2006), vol. 22, 7881-7884.*

* cited by examiner

*Primary Examiner* — David Turocy
*Assistant Examiner* — Joel Horning
(74) *Attorney, Agent, or Firm* — The Nath Law Group; Tanya E. Harkins; Mih Suhn Koh

(57) ABSTRACT

Disclosed are a nanocrater catalyst in metal nanoparticles with a nanocrater form of hole structure in center of the catalyst which is useful for manufacturing nano-sized materials and/or articles with desired structure and characteristics, a preparation method thereof including a plasma etching and chemical etching process ("PTCE process"), and nano-sized materials and/or articles manufactured by using the nanocrater catalyst in metal nanoparticles.

9 Claims, 11 Drawing Sheets

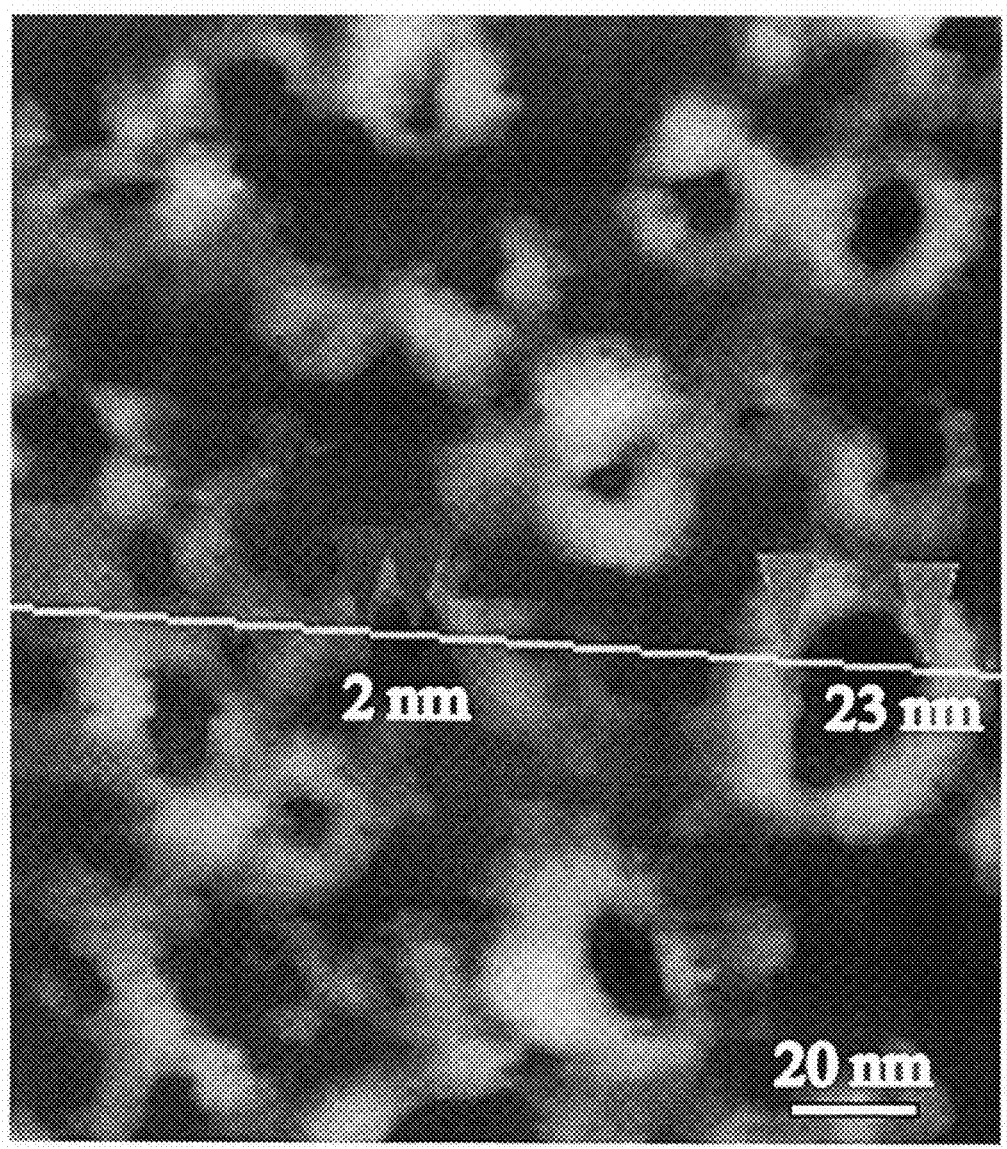

NANOCRATER CATALYST IN METAL NANOPARTICLES AND METHOD FOR PREPARING THE SAME

This application claims priority to Korean Patent Application No. 10-2007-0102100, filed on Oct. 10, 2007, in the Korean Intellectual Property Office, the entire contents of which are hereby incorporated by reference.

BACKGROUND OF THE INVENTION

1. Field of the Invention

The present invention relates to nanocrater catalyst in metal nanoparticles and their preparation methods, more particularly, to a nanocrater catalyst in metal nanoparticles with a nanocrater form of hole structure at the center of the catalyst, a preparation method thereof including a plasma etching and chemical etching process ("PTCE process") and nano-sized materials and/or articles manufactured by using the nanocrater catalyst in metal nanoparticles.

2. Description of the Related Art

Nano-sized metal particles have electric, optic and/or magnetic properties different from those of bulk metal materials and have recently received increased attention in a wide range of applications.

Metal nanoparticles having nano-sized holes are possibly combined with advanced sciences and technologies to be used in a variety of applications. Extensive research and investigation into metal nanoparticles is proceeding all over the world, since the metal nanoparticles are absolutely required as a catalyst in production of nano-sized materials and/or articles.

Accordingly, metal nanoparticles used in production of nano-sized materials closely correlate with structure and characteristics of the resulting nano-sized materials and/or articles. In order to produce a desired product with desired structure and characteristics, there is a requirement to study structure and characteristics of a catalyst, that is, metal nanoparticles used as the catalyst.

However, there are still serious problems or difficulties in preparation of metal nanoparticles with desired structure and characteristics and, in the present circumstances, studies and developments of the metal nanoparticles have not considerably progressed.

Commonly known methods or technologies in the related arts, for example, electron beam lithography, micro-contact printing, shadow mask and the like have been employed to control alignment or orientation of particles and/or particle size. However, such methods have drawbacks in that these are not commercially available due to high production costs, and substrates to be processed are restricted to very small dimensions.

Another method was proposed to provide metal catalysts with uniform dimension using AAO (anodic aluminum oxide) templates. But, commercially available AAO templates usually have a hole size of more than 100 nm and are substantially unable to have a hole size of less than 50 nm regardless of variation of the processing conditions.

Consequently, there is still a strong demand to develop novel metal catalysts with controlled structure sufficient to produce nano-sized materials and/or articles having desired structure and characteristics.

SUMMARY OF THE INVENTION

After extensive research and investigation to develop a variety of nano-sized materials (hereinafter, often referred to as "nano materials") such as carbon nanotubes, the present inventors have found that structure and characteristics of nano materials are closely connected with structure and characteristics of specific materials used as a catalyst and, additionally, structure of the catalyst must be controlled to produce the nano materials with desired structure and characteristics. As a result, the present invention was successfully accomplished under these findings.

Accordingly, the present invention is directed to solve problems of conventional methods as described above and, an object of the present invention is to provide a nanocrater catalyst in metal nanoparticles with a nanocrater form of hole structure at the center of the catalyst (hereinafter, often referred to as "nanocrater metal catalyst") useful for manufacturing nano-sized materials with desired structure and characteristics.

Another objective of the present invention is to provided a method for preparing a nanocrater metal catalyst, which can treat massive metal nanoparticles by a simple and economical process.

A still further objective of the present invention is to provide nano-sized materials with desired structure (and characteristics) manufactured by using the nanocrater metal catalyst produced according to the present invention.

BRIEF DESCRIPTION OF THE DRAWINGS

These and other objectives, features, aspects, and advantages of the present invention will be more fully described in the following detailed description of preferred embodiments and examples, taken in conjunction with the accompanying drawings. In the drawings:

FIG. 1A is a SEM photograph showing a nanocrater iron catalyst formed on a silicon substrate; and FIG. 1B is an AFM (atomic force microscope) photograph showing enlarged condition of one particle of the nanocrater iron catalyst;

FIG. 2B is a graph illustrating an analysis result of surface height of the nanocrater iron catalyst;

FIG. 2C is an AFM photograph showing a nanocrater cobalt catalyst;

FIG. 3A is a SEM photograph showing carbon nitride nanotubes and carbon nanospheres with hollow center structure; FIG. 3B is a TEM (transmission electronic microscope) photograph showing carbon nitride nanotubes; FIG. 3C is a TEM photograph showing carbon nanosphere with hollow center structure; FIG. 3D is a TEM photograph showing two pairs of carbon nitride nanotubes; and FIG. 3E is a TEM photograph showing enlarged bottom portions of two pairs of carbon nitride nanotubes.

DETAILED DESCRIPTION OF THE INVENTION

Figure 1A:
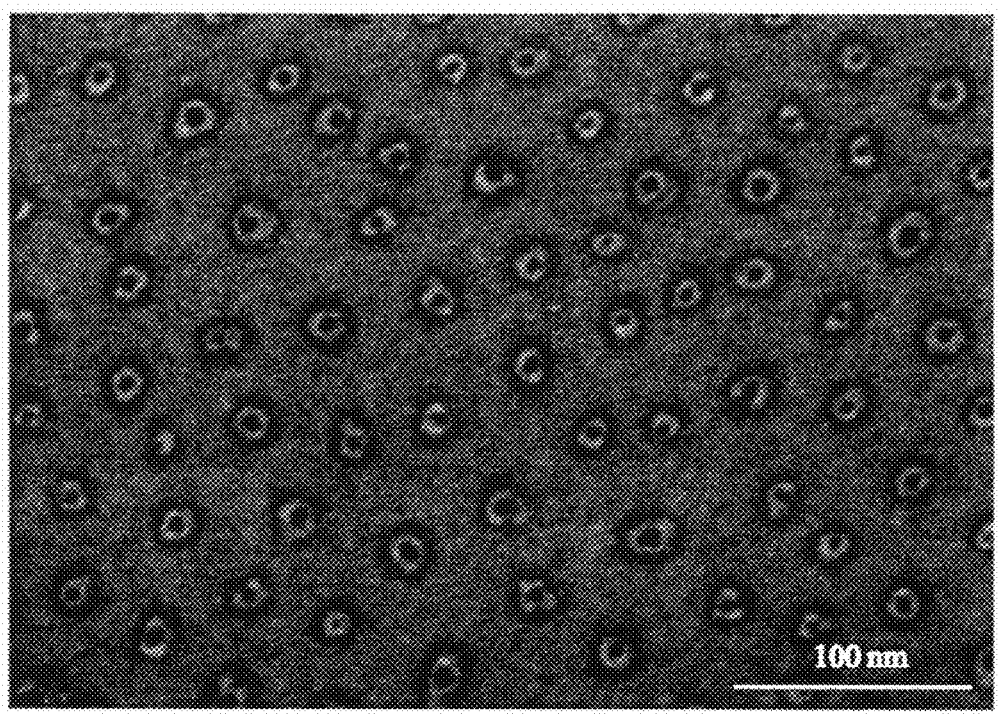
FIGS. 1A and 1B are scanning electronic microscope (SEM) photographs showing a nanocrater iron catalyst produced by a general plasma etching and chemical etching process (PTCE), in particular.

In order to achieve the objectives described above, the present invention provides a nanocrater catalyst in metal nanoparticles with a nanocrater form of hole structure at the center of the catalyst, which has vacancy and dislocation between metal nanoparticles of the catalyst, that is, a nanocrater metal catalyst.

The present invention also provides a method for preparing a nanocrater catalyst in metal nanoparticles, comprising the steps of: (a) pre-treating metal nanoparticles vapor-deposited on a substrate with plasma to form vacancy and dislocation between the metal nanoparticles; and (b) chemically etching the metal nanoparticles after the plasma pre-treatment, to form a hole at the center of each of the metal nanoparticles.

Still further, the present invention provides nano-sized materials manufactured using the nanocrater catalyst in metal nanoparticles.

The nanocrater metal catalyst of the present invention has advantages in that: the catalyst is useful for manufacturing a variety of nano materials; and has variable sizes and structures to uniformly control number of walls of the nano materials, therefore, can appropriately control structures of the nano materials such as carbon nanotubes.

An aspect of the present invention provides a nanocrater metal catalyst with a nanocrater form of hole structure at the center of the catalyst, which has vacancy and dislocation between metal nanoparticles of the catalyst.

The term "nanocrater catalyst" used in the present invention means a metal nanoparticle catalyst with a nanocrater form of hole structure at the center of each nanoparticle of the catalyst.

Metal ingredient of the nanocrater metal catalyst according to the present invention includes, for example, at least one selected from elements belonging to Groups 3 to 14 in the Periodic Table and, illustrative examples of the metal ingredient are not particularly limited, but, include Al, Ga, In, Tl, Sn, Pb, Cu, Ag, Au, Zn, Cd, Sc, Y, Ti, Zr, Hf, V, Nb, Ta, Cr, Mo, W, Mn, Tc, Re, Fe, Co, Ni, Ru, Rh, Pd, Os, Ir, Pt and so on. Preferably, the metal ingredient comprises Fe and Co which can be used as a catalyst to grow carbon nanotubes.

As characteristics and structure of nano materials are closely related to characteristics and structure of catalyst materials, it is required to control structure of the catalyst in order to produce the nano material having desired characteristics and structure. More particularly, since the nanocrater metal catalyst of the present invention has a nanocrater form of hole structure, number of walls of the nano materials such as carbon nanotubes can be regulated when controlling the structure of the catalyst, thereby appropriately controlling thickness of the nano materials, that is, carbon nanotubes.

The nanocrater metal catalyst of the present invention has a nanocrater form of hole structure, which has a size ranging from 1 to 50 nm, preferably, 10 to 20 nm and, more preferably, 14 to 18 nm. If the size of the hole is more than 50 nm, the hole is so large over an overall size of the catalyst that the nanocrater catalyst may not keep its inherent structure and, thus, cause a problem of not regulating diameter of the nanotubes grown from the nanocrater catalyst in the small range.

The nanocrater metal catalyst of the present invention has thickness ranging from 1 to 20 nm, preferably, 3 to 16 nm and, more preferably, 4 to 14 nm. If the thickness is more than 20 nm, the nanocrater catalyst also causes a problem of not regulating diameter of the nanotubes grown from the nanocrater catalyst in the small range.

The second aspect of the present invention provides a method for preparing a nanocrater metal catalyst, comprising the steps of: (a) pre-treating metal thin films vapor-deposited on a substrate with plasma to form vacancy and dislocation between metal nanoparticles of the catalyst; and (b) chemically etching the metal nanoparticles after the plasma pre-treatment, to form a hole at the center of each of the metal nanoparticles.

In order to prepare the nanocrater metal catalyst of the present invention, a metal nanoparticle film vapor-deposited on the substrate undergoes a nitrogen plasma etching process and a subsequent chemical etching process using an iodine-containing nitric acid/ethanol solution, which is known as PTCE (plasma-treated chemical etching) process.

The plasma pre-treatment in the step (a) is to form vacancy and dislocation between the metal nanoparticles. The substrate is not particularly limited, but, includes an inorganic substrate fabricated of silicon, glass, etc. and an organic substrate fabricated of any one selected from a group consisting of: polyethylene naphthalate (PEN); polyethylene terephthalate (PET); polycarbonate; polyvinylalcohol; polyacrylate; polyimide; polynorbornene; polyethersulfone (PES) and the like.

The plasma treatment is preferably conducted under nitrogen gas atmosphere and, the nitrogen gas has a flow rate ranging from 80 to 120 sccm (standard cubic centimeters per minute), preferably, 90 to 110 sccm, and more preferably, about 100 sccm.

The plasma treatment is preferably conducted with a plasma power ranging from 500 to 800 W, and preferably, 600 to 700 W at a temperature ranging from 600 to 1,000□, preferably, 700 to 900□, and more preferably, 900□.

The present inventive method for preparing the nanocrater metal catalyst includes an additional chemical etching process after the plasma pre-treatment, in order to form a hole at the center of each of the metal nanoparticles. This etching process preferably uses a solution of ethanol/nitric acid containing iodine.

The iodine-containing nitric acid/ethanol solution is a solution mixture of ethanol and 10 to 30% (v/v) nitric acid containing 1 to 10% by weight of iodine (I) relative to volume of ethanol, which forms vacancy and dislocation between metal nanoparticles generated during the plasma treatment to produce the hole at the center of each of the nanoparticles.

In the method for preparing the metal catalyst according to the present invention, the chemical etching process is conducted for an appropriately controlled term of generally 2 to 4 hours, and preferably, for 3 hours. In case that the chemical etching treatment time exceeds the above desired range, the etching treatment proceeds in an excess to cause a problem of not maintaining the inherent structure of the metal nanoparticles.

Metal ingredient used in the metal catalyst according to the present invention includes, for example, at least one selected from elements belonging to Groups 3 to 14 in the Periodic Table and, illustrative examples of the metal ingredient are not particularly limited, but, include Al, Ga, In, Tl, Sn, Pb, Cu, Ag, Au, Zn, Cd, Sc, Y, Ti, Zr, Hf, V, Nb, Ta, Cr, Mo, W, Mn, Tc, Re, Fe, Co, Ni, Ru, Rh, Pd, Os, Ir, Pt, etc. Preferably, the metal ingredient comprises Fe and Co which can be used as a growth catalyst of carbon nanotubes.

The third aspect of the present invention provides nano materials manufactured using the nanocrater metal catalyst of the present invention.

Illustrative examples of such nano materials are not particularly limited, but, include nanotube, nanorod, nanowire, nanoneedle, nanoparticle and the like.

For carbon nanotubes according to an embodiment of the present invention, these are fabricated by using the nanocrater metal catalyst with a nanocrater form of hole structure, and thus, have a constant number of walls. As a result, the fabricated nanotubes have specific characteristics and structure such as uniform diameter size.

Hereinafter, the present invention will become apparent from the following examples and experimental examples with reference to the accompanying drawings. However, these are intended to illustrate the invention as preferred embodiments of the present invention and do not limit the scope of the present invention.

Example 1

Preparation of Nanocrater Iron Catalyst

For preparation of a nanocrater iron catalyst, first of all, an iron film with a thickness of about 10 nm was vapor-deposited on a silicon substrate at 200° C. by means of a sputtering process. Then, the deposited substrate was plasma etched using 100 sccm of nitrogen gas with a plasma power of 600 W at 800° C. for 1 minute.

Among the above processes, the metal films separated and etched in the range of nano units by the plasma treatment process produced a plurality of vacancies and dislocations in inherent structure of the metal nanoparticles. Next, after preparing an iodine-containing nitric acid/ethanol solution which was a solution mixture of 100 Ml of ethanol and 20 Ml of nitric acid containing 3.5 g of iodine (I), the metal nanoparticles with vacancies and dislocations in structure thereof underwent the etching process in the prepared solution for 3 hours. As a result, a nanocrater iron catalyst with a nanocrater form of hole structure at the center of the nanoparticles was produced.

Example 2

Preparation of Nanocrater Cobalt Catalyst

For preparation of a nanocrater iron catalyst, first of all, a cobalt film with thickness of about 10 nm was vapor-deposited on a silicon substrate at 200° C. by means of a sputtering process. Then, the deposited substrate was plasma etched using 90 sccm of nitrogen gas with a plasma power of 700 W at 700° C. for 1 minute.

Among the above processes, the metal films separated and etched in the range of nano units by the plasma process produced a plurality of vacancies and dislocations in inherent structure of the metal nanoparticles. Next, after preparing an iodine-containing nitric acid/ethanol solution which was a solution mixture of 100 Ml of ethanol and 20 Ml of nitric acid containing 3.5 g of iodine (I), the metal nanoparticles with vacancy and dislocation in structure thereof underwent the etching process in the prepared solution for 3 hours. As a result, a nanocrater cobalt catalyst with a nanocrater form of hole structure at the center of the nanoparticles was produced.

Example 3

Fabrication and Growth of Carbon Nanotubes by Using Nanocrater Iron Catalyst

By means of plasma chemical vapor-deposition using the nanocrater iron catalyst prepared in Example 1, carbon nanotubes were fabricated. More particularly, the carbon nanotubes were produced using the nanocrater iron catalyst together with 85 sccm of nitrogen gas and 15 sccm of methane gas for 8 minutes in desired conditions of plasma power of 700 W at 900° C. under 23 Torr of pressure.

Experimental Example 1

Structural Analysis of Nanocrater Iron Catalyst and Nanocrater Cobalt Catalyst

In order to analyze structure of the nanocrater iron catalyst according to the present invention, SEM and AFM photographs were taken for structures of the nanocrater iron catalyst prepared in Example 1 and the nanocrater cobalt catalyst prepared in Example 2, respectively, and the results are illustrated in FIGS. 1A to 2D.

Figure 1B:
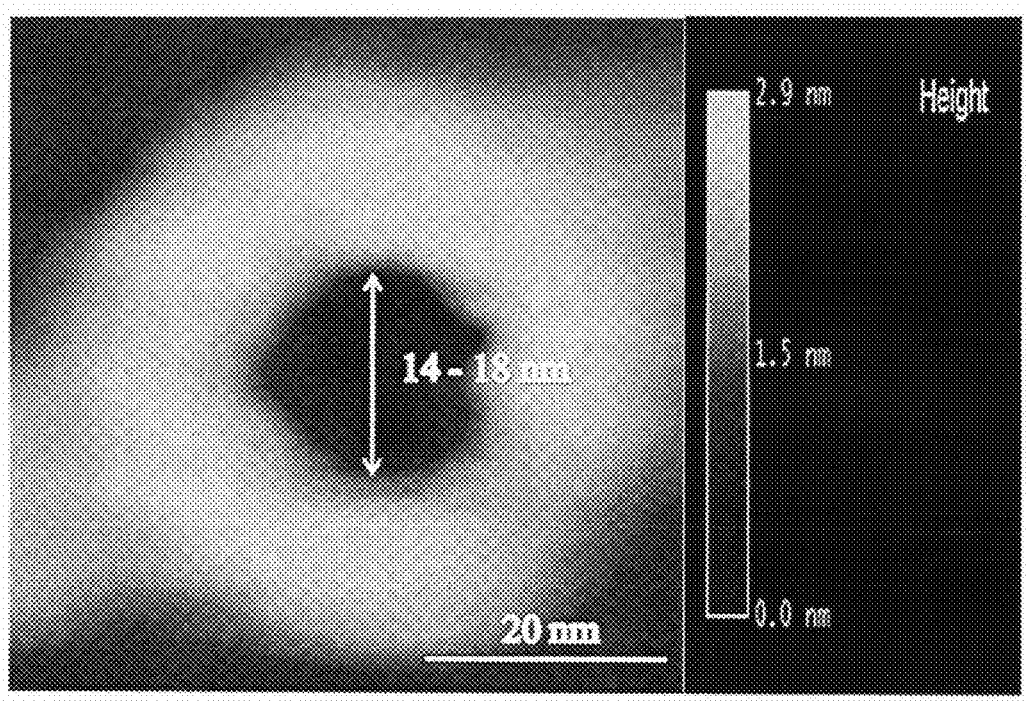

FIGS. 1A and 1B are SEM photographs showing a nanocrater iron catalyst produced by a plasma etching and chemical etching process (PTCE).

FIG. 1A is a SEM photograph showing a nanocrater iron catalyst formed on a silicon substrate. Referring to FIG. 1A, it was found that the nanocrater catalyst was uniformly formed on the silicon substrate. Meanwhile, FIG. 1B is an AFM photograph showing enlarged condition of one of the nanocrater iron catalysts. As a result, it was observed that a hole with a size of 14 to 18 nm was formed at the center of each of the nanoparticles by means of a chemical etching process.

Figure 2A:
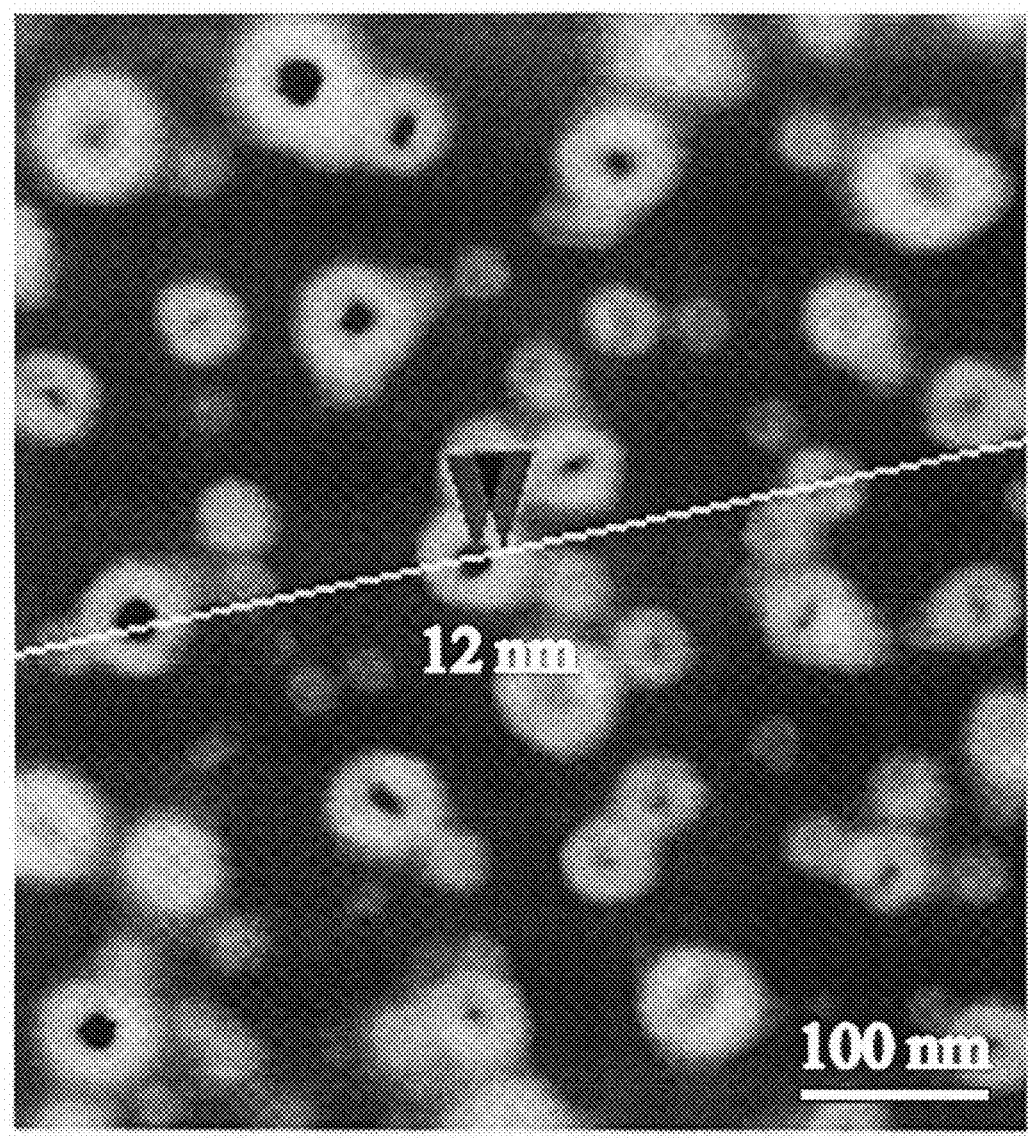
FIG. 2A is an AFM photograph showing the nanocrater iron catalyst.

FIGS. 2A and 2C are AFM photographs showing the nanocrater iron catalyst and the nanocrater cobalt catalyst, respectively. Especially, FIG. 2A is an AFM photograph of the nanocrater iron catalyst while FIG. 2C is an AFM photograph of the nanocrater cobalt catalyst.

Figure 2D:
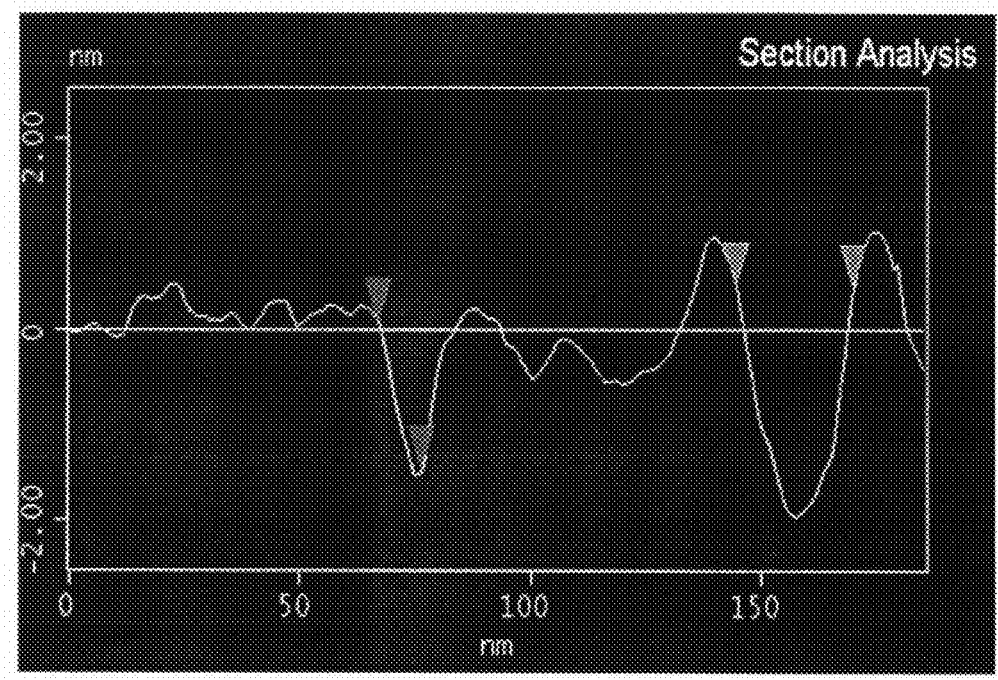
FIG. 2D is a graph illustrating an analysis result of surface height of the nanocrater cobalt catalyst.

FIGS. 2B and 2D illustrate analysis results of surface heights measured along lines indicated in FIGS. 2A and 2C, respectively. Referring to FIGS. 2B and 2C, it is found that the nanocrater iron catalyst has a thickness of about 14 nm while the nanocrater cobalt catalyst has a thickness of about 4 nm.

Experimental Example 2

Structural Analysis of Carbon Nanotubes Using Nanocrater Iron Catalyst

In order to analyze structure of a specific nano material by using the nanocrater metal catalyst according to the present invention, SEM and AFM photographs were taken for structure of the carbon nanotubes fabricated in Example 2, and the results are illustrated in FIGS. 3A to 3E.

Figure 3A:
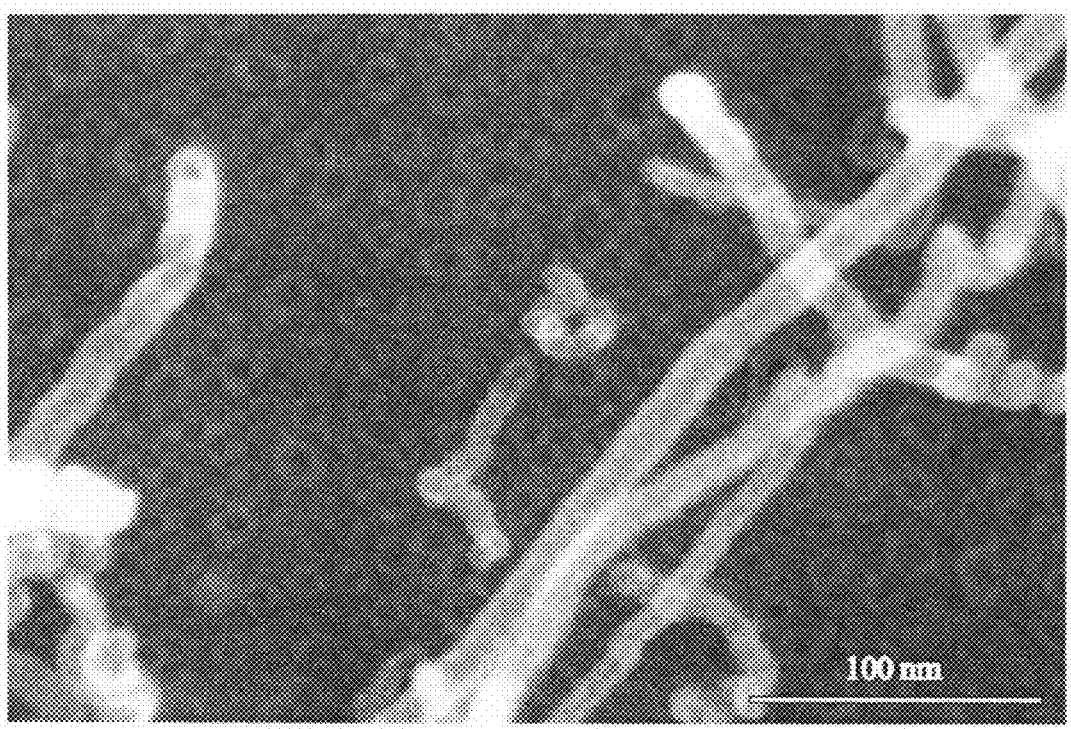
FIGS. 3A to 3E illustrate carbon nitride nanotubes and carbon nanospheres with hollow center structure, both of which are manufactured using the nanocrater iron catalyst of the present invention, in particular.
Figure 3B:
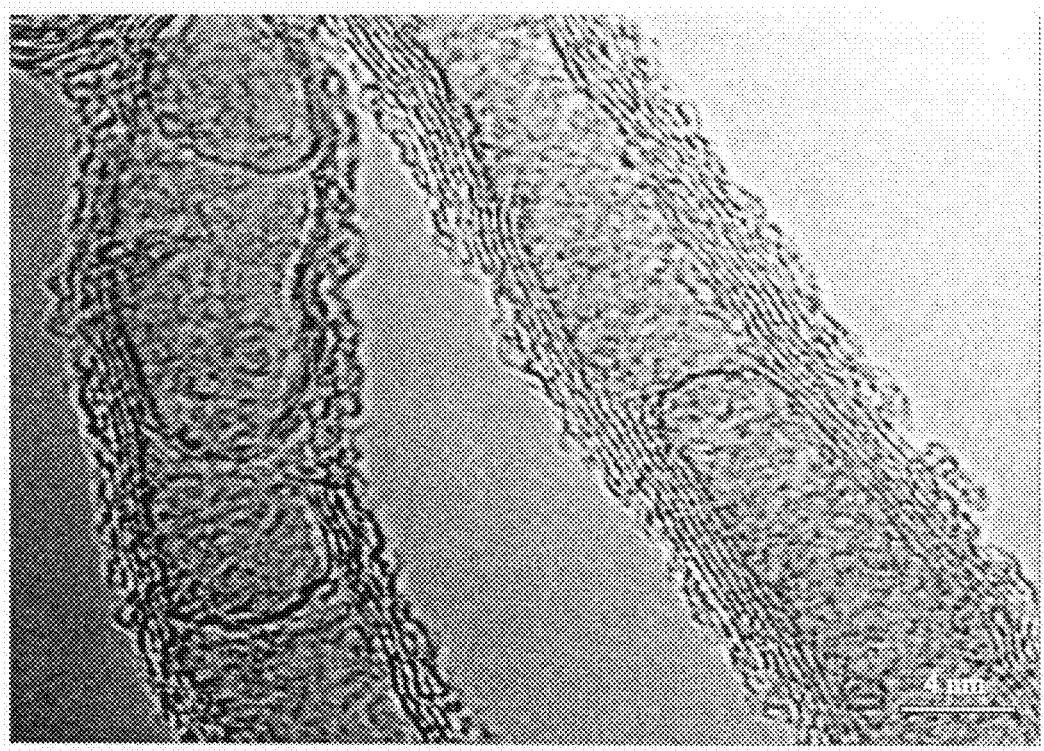
Figure 3C:
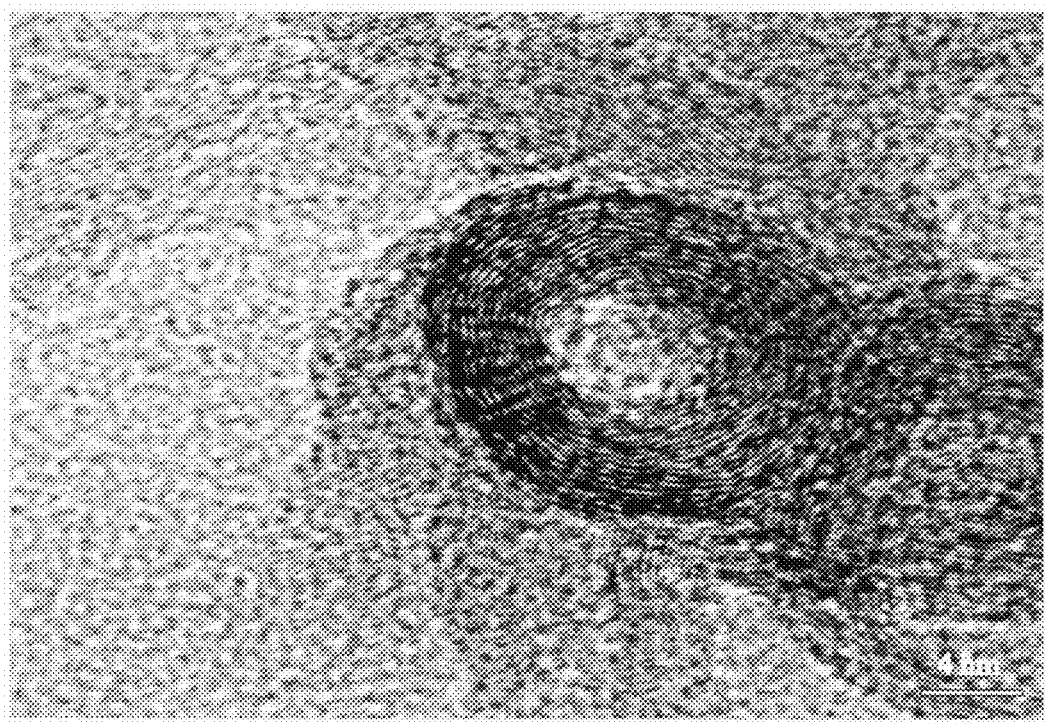
Figure 3D:
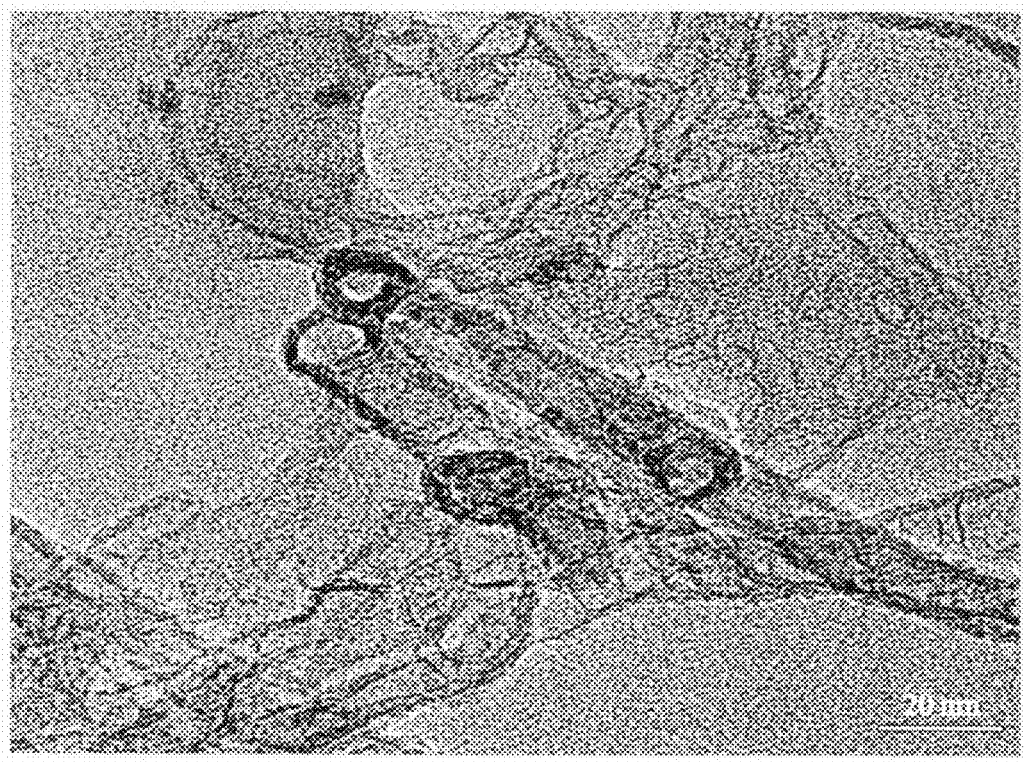

FIG. 3A is a SEM photograph showing carbon nitride nanotubes and carbon nanospheres with hollow center structure; FIG. 3B is a TEM photograph showing carbon nitride nanotubes; FIG. 3C is a TEM photograph showing carbon nanosphere with hollow center structure; and FIG. 3D is a TEM photograph showing two pairs of carbon nitride nanotubes.

Figure 3E:
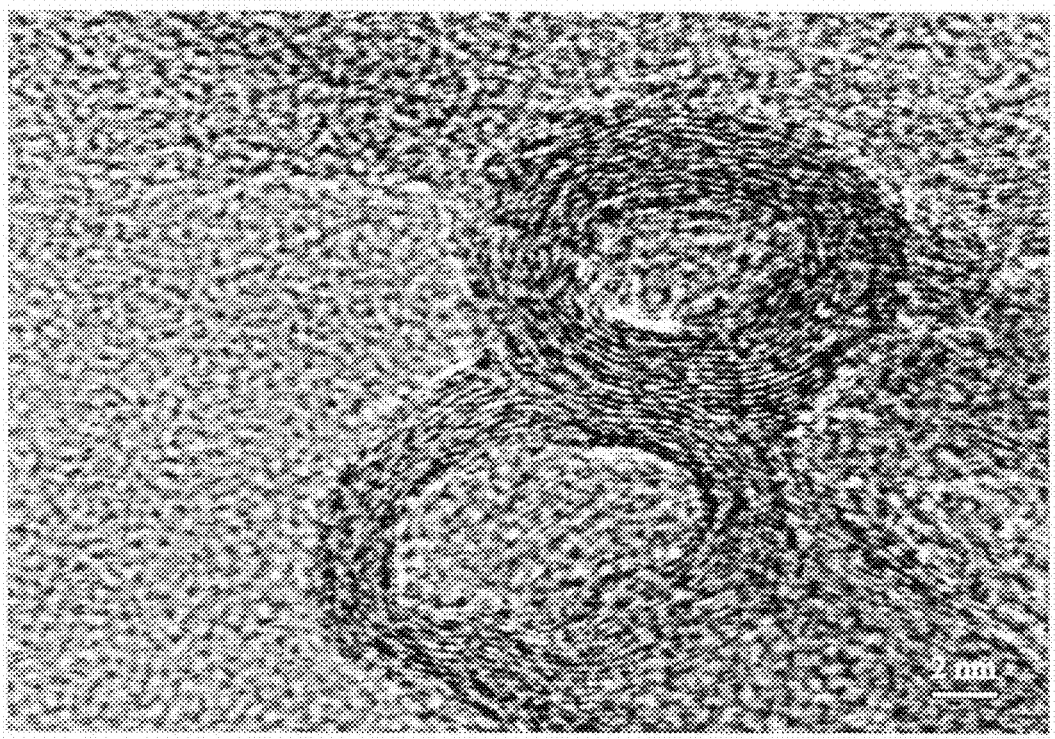

In addition, FIG. 3E is a TEM photograph showing enlarged bottom portions of two pairs of carbon nitride nanotubes. Referring to FIG. 3E, it was found that the nanotubes had an inner diameter of 5 to 8 nm and such inner diameter was substantially identical to size of the nanocrater iron catalyst. Also, as shown in FIG. 3E, it can be clearly understood that two pairs of carbon nitride nanotubes were all grown to have a uniform thickness sufficient to form 3 to 8 walls.

As described above, a nanocrater metal catalyst according to the present invention has advantages in that: the catalyst can be used in manufacturing a variety of nano-sized materials; and has variable sizes and structures to uniformly control number of walls of the nano materials, therefore, can control structures of the nano materials such as carbon nanotubes as desired.

While the present invention has been described with reference to the preferred embodiments and examples, it will be understood by those skilled in the art that various modifications and variations may be made therein without departing from the scope of the present invention as defined by the appended claims.

What is claimed is:

1. A method of preparing a nanocrater catalyst in metal nanoparticles, comprising:
    (a) vapor-depositing metal nanoparticles on a substrate to form a metal nanoparticle film;
    (b) pre-treating the vapor-deposited metal nanoparticle film with plasma, to form metal nanoparticles with a plurality of vacancies and dislocations; and
    (c) chemically etching the metal nanoparticles, after the plasma pre-treatment, to form a hole at the center of each of the metal nanoparticles.

2. The method according to claim 1, wherein the pre-treating is conducted under nitrogen gas atmosphere.

3. The method according to claim 2, wherein the nitrogen gas has a flow rate ranging from 80 to 120 sccm.

4. The method according to claim 1, wherein the pre-treating is conducted with a plasma power ranging from 500 to 800 W at a temperature ranging from 600 to 1,000° C.

5. The method according to claim 1, wherein the chemically etching is carried out using an iodine-containing nitric/ethanol solution.

6. The method according to claim 5, wherein the iodine-containing nitric acid/ethanol solution is a solution mixture of ethanol and 10 to 30% (v/v) nitric acid containing 1 to 10% by weight of iodine(I), relative to volume of the ethanol.

7. The method according to claim 5, wherein the chemically etching is carried out for 2 to 4 hours.

8. The method according to claim 1, wherein the metal comprises at least one selected from elements belonging to Groups 3 to 14 in the Periodic Table.

9. The method according to claim 1, wherein the metal is one or two selected from iron (Fe) and cobalt (Co).

* * * * *